(12) United States Patent
Khatwa et al.

(10) Patent No.: US 9,547,993 B2
(45) Date of Patent: Jan. 17, 2017

(54) AUTOMATED AIRCRAFT GROUND THREAT AVOIDANCE SYSTEM

(71) Applicant: Honeywell International Inc., Morristown, NJ (US)

(72) Inventors: Ratan Khatwa, Sammamish, WA (US); Jayasenthilnathan B, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 20 days.

(21) Appl. No.: 14/629,017

(22) Filed: Feb. 23, 2015

(65) Prior Publication Data

US 2016/0247406 A1 Aug. 25, 2016

(51) Int. Cl.
| | |
|---|---|
| *G08G 5/06* | (2006.01) |
| *G08G 5/04* | (2006.01) |
| *G08G 5/00* | (2006.01) |
| *G01S 19/51* | (2010.01) |
| *G01S 13/93* | (2006.01) |

(Continued)

(52) U.S. Cl.
CPC .............. *G08G 5/04* (2013.01); *B64D 45/04* (2013.01); *G01S 13/93* (2013.01); *G01S 19/51* (2013.01); *G05D 1/0083* (2013.01); *G08G 5/0021* (2013.01); *G08G 5/045* (2013.01); *G08G 5/06* (2013.01); *G08G 5/065* (2013.01)

(58) Field of Classification Search
CPC .......... G01S 19/51; G01S 13/93; G08G 5/065; G08G 5/06; G08G 5/045; G08G 5/04; B64D 45/04

See application file for complete search history.

(56) References Cited

U.S. PATENT DOCUMENTS

| | | | | |
|---|---|---|---|---|
| 4,104,638 A | * | 8/1978 | Middleton | ........... G08G 5/0008 340/903 |
| 4,775,116 A | * | 10/1988 | Klein | ................. A61B 5/14553 244/76 R |

(Continued)

FOREIGN PATENT DOCUMENTS

| | | |
|---|---|---|
| EP | 1329863 | 7/2003 |
| EP | 2506105 A2 | 3/2012 |
| EP | 2824529 A2 | 1/2015 |

OTHER PUBLICATIONS

Khatwa, "An Analysis of Runway Incursions 1990-2002," Honeywell, 55th FSF/IFA International Air Safety Seminar, Nov. 2002, 19 pp.

(Continued)

*Primary Examiner* — Russell Frejd
(74) *Attorney, Agent, or Firm* — Shumaker & Sieffert, P.A.

(57) ABSTRACT

This disclosure is directed to methods, systems, and computer program products for automated avoidance of ground threats by an aircraft. In one example, a method includes determining, by one or more processing devices, whether a sufficient evasive maneuver for an aircraft to avoid a detected ground surface threat is performed via pilot controls of the aircraft within a selected threshold after an alert of the ground surface threat is outputted via one or more cockpit systems of the aircraft. The method further includes, in response to determining that a sufficient evasive maneuver via the pilot controls is not performed within the selected threshold, controlling, by the one or more processing devices, one or more flight systems of the aircraft to perform an automated evasive maneuver to avoid the ground surface threat.

20 Claims, 6 Drawing Sheets

(51) Int. Cl.
  *B64D 45/04* (2006.01)
  *G05D 1/00* (2006.01)

(56) References Cited

U.S. PATENT DOCUMENTS

| | | | | |
|---|---|---|---|---|
| 4,835,537 | A | * | 5/1989 | Manion ................ G01S 5/0009 340/961 |
| 5,381,338 | A | * | 1/1995 | Wysocki ................ G01C 23/00 348/116 |
| 6,133,867 | A | * | 10/2000 | Eberwine .............. G01S 5/0072 342/125 |
| 6,314,366 | B1 | * | 11/2001 | Farmakis .............. B60R 25/102 340/961 |
| 6,405,132 | B1 | | 6/2002 | Breed et al. |
| 7,098,810 | B2 | | 8/2006 | Bateman et al. |
| 7,295,925 | B2 | | 11/2007 | Breed et al. |
| 7,418,346 | B2 | | 8/2008 | Breed et al. |
| 7,426,437 | B2 | | 9/2008 | Breed et al. |
| 7,606,115 | B1 | * | 10/2009 | Cline .................... G08G 5/045 367/124 |
| 7,629,899 | B2 | | 12/2009 | Breed |
| 7,647,180 | B2 | | 1/2010 | Breed |
| 7,840,342 | B1 | | 11/2010 | Breed |
| 7,840,355 | B2 | | 11/2010 | Breed et al. |
| 7,899,616 | B2 | | 3/2011 | Breed |
| 7,899,621 | B2 | | 3/2011 | Breed et al. |
| 7,990,283 | B2 | | 8/2011 | Breed |
| 8,000,897 | B2 | | 8/2011 | Breed et al. |
| 8,024,078 | B2 | | 9/2011 | Coulmeau et al. |
| 8,255,144 | B2 | | 8/2012 | Breed et al. |
| 8,457,812 | B2 | | 6/2013 | Zammit-Mangion et al. |
| 2002/0069019 | A1 | * | 6/2002 | Lin ...................... G05D 1/0055 701/301 |
| 2002/0133294 | A1 | * | 9/2002 | Farmakis .............. B60R 25/102 701/301 |
| 2005/0150371 | A1 | * | 7/2005 | Rickard ................ F41H 3/00 89/1.11 |
| 2008/0021647 | A1 | | 1/2008 | Daveze et al. |
| 2008/0306691 | A1 | | 12/2008 | Louis et al. |
| 2010/0042273 | A1 | | 2/2010 | Meunier et al. |
| 2010/0121575 | A1 | * | 5/2010 | Aldridge .............. G08G 5/0069 701/301 |
| 2011/0148665 | A1 | | 6/2011 | Dehais et al. |
| 2012/0253555 | A1 | * | 10/2012 | Stange ................ G05D 1/0055 701/3 |
| 2013/0321192 | A1 | * | 12/2013 | Starr ...................... G01S 7/04 342/29 |
| 2014/0062756 | A1 | * | 3/2014 | Lamkin ................ G08G 5/0021 342/29 |
| 2014/0278037 | A1 | | 9/2014 | Choksi et al. |
| 2014/0343765 | A1 | | 11/2014 | Suiter et al. |
| 2015/0266591 | A1 | | 9/2015 | Petillon |

OTHER PUBLICATIONS

Khatwa et al., "Human Factors Flight Test Evaluation of an Airport Surface Display with Indications & Alerts (SURFIA)," Honeywell International, Oct. 2010, 20 pp.

Cheng et al., "Automation Tools for Enhancing Ground-Operation Situation Awareness and Flow Efficiency," AIAA Guidance, Navigation, and Control Conference and Exhibit, Aug. 2002, 11 pp.

Cheng, "Surface Operation Automation Research for Airport Tower and Flight Deck Automation," Proceedings of the 7th International IEEE Conference on Intelligent Transportation Systems, Oct. 2004, 6 pp.

Rezvani, "An Intelligent Tool Prevents Runway Incursion at Airports," TU International, vol. 67, Jan. 2011, 2 pp.

Sammut et al., "Design and Preliminary Pilot Assessment of a Directive Runway Conflict Alerting and Resolution System," Proceedings of the 27th International Congress of the Aeronautical Sciences, Sep. 2010, 16 pp.

Shi, "Making Existing Reactive Systems Anticipatory: Methodology and Case Studies," Doctoral Dissertation, Graduate School of Science and Engineering, Saitama University, Jun. 2013, 101 pp.

Extended Search Report from counterpart European Application No. 16155336.7, dated Oct. 6, 2016, 7 pp.

* cited by examiner

AUTOMATED AIRCRAFT GROUND THREAT AVOIDANCE SYSTEM

This disclosure relates to aviation systems.

BACKGROUND

As commercial aviation traffic has continued to increase over the years, airports have grown increasingly busy, leading to increased potential for violations of procedural trajectory separations of aircraft with other aircraft and with ground traffic on airport runways and taxiways. An increasing amount of air traffic has also come to involve very large airliners with very long wingspans, which may sometimes reduce wingtip clearance margins between aircraft while the aircraft are in motion on airport ground surfaces, and which may sometimes make proper wingtip clearance relative to ground structures more of a concern. Potential ground collision threats to an aircraft by another aircraft or ground vehicle on a runway, taxiway, or gate area are referred to as traffic incursions. An aircraft veering off the runway during takeoff or landing is referred to as a trajectory excursion. These trajectory excursions can lead to traffic incursions.

SUMMARY

This disclosure is directed to methods, systems, and computer program products for providing automated aircraft ground surface threat avoidance due to threats such as traffic incursions, trajectory excursions, and potential collisions on airport ground surfaces. A system of this disclosure may detect a ground surface threat from a potential traffic incursion, trajectory excursion, or collision; provide a warning of the ground surface threat to the flight crew; determine if the flight crew performs a sufficient evasive maneuver within a selected threshold, e.g., of time, distance, or altitude; and if the flight crew fails to perform a sufficient evasive maneuver, control the aircraft to perform an automated evasive maneuver.

The detected threat may be another aircraft or a ground vehicle on a potential incursion or collision trajectory. The detected threat may also be a prediction of insufficient wingtip separation and potential wingtip collision between an ownship (an aircraft on which an automated aircraft ground surface threat avoidance is implemented) and another taxiing aircraft or a ground structure. The detected threat may also be an excursion trajectory of an ownship, such as the ownship being lined up on final approach for landing toward a taxiway rather than a runway, or a ground taxiing trajectory toward a ground structure or obstacle. If the aircraft is on approach to landing, the automated evasive maneuver may be to enter a procedural go-around or a procedural missed approach for later approach and landing on the runway, for example. If the aircraft is taxiing on the ground or accelerating for takeoff, the automated evasive maneuver may be to decelerate, stop, perform steering of the nose wheel of the aircraft, or a combination thereof to avoid the threat, for example. A system of this disclosure may therefore provide automated ground threat avoidance to avoid threats such as potential airport traffic incursions, trajectory excursions, and collisions when necessary.

In one example, a method includes determining, by one or more processing devices, whether a sufficient evasive maneuver for an aircraft to avoid a detected ground surface threat is performed via pilot controls of the aircraft within a selected threshold after an alert of the ground surface threat is outputted via one or more cockpit systems of the aircraft. The method further includes, in response to determining that a sufficient evasive maneuver via the pilot controls is not performed within the selected threshold, controlling, by the one or more processing devices, one or more flight systems of the aircraft to perform an automated evasive maneuver to avoid the ground surface threat.

In another example, a system includes one or more processors configured to determine whether a sufficient evasive maneuver for an aircraft to avoid a detected ground surface threat is performed via pilot controls of the aircraft within a selected threshold after an alert of the ground surface threat is outputted via one or more cockpit systems of the aircraft. The system further includes one or more processors configured to control, in response to determining that a sufficient evasive maneuver via the pilot controls is not performed within the selected threshold, one or more flight systems of the aircraft to perform an automated evasive maneuver to avoid the ground surface threat.

In another example, a computer program product includes a non-transitory data storage device. The computer program product further includes executable instructions stored on the data storage device to cause the one or more processing devices to determine whether a sufficient evasive maneuver for an aircraft to avoid a detected ground surface threat is performed via pilot controls of the aircraft within a selected threshold after an alert of the ground surface threat is outputted via one or more cockpit systems of the aircraft. The computer program product further includes executable instructions stored on the data storage device to cause the one or more processing devices to control, in response to determining that a sufficient evasive maneuver via the pilot controls is not performed within the selected threshold, one or more flight systems of the aircraft to perform an automated evasive maneuver to avoid the ground surface threat.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Various examples are described below generally directed to techniques, methods, systems, and computer program products that may provide automated aircraft ground traffic incursion, trajectory excursion, and collision avoidance. In some examples, one or more subsystems may provide airport moving map images, perform detections and predictions of potential threats, and generate alerts when potential threats are detected or predicted. In some examples, another subsystem may then monitor the flight crew's actions after an alert is issued to determine whether the flight crew performs a sufficient evasive maneuver within a selected threshold (e.g., an interval of time, an altitude threshold, a distance threshold, a combination of the above), and if not, then to perform an automated evasive maneuver. In some examples, a unitary system may perform all of these actions. In either case, a system of this disclosure may include or be connected to various other aircraft systems such as Automatic Dependent Surveillance—Broadcast (ADS-B) or other surveillance systems, flight controls, enhanced runway taxiing and landing imaging and alerting subsystems, and 2D or 3D airport moving map display (AMMD) systems.

Figure 1:
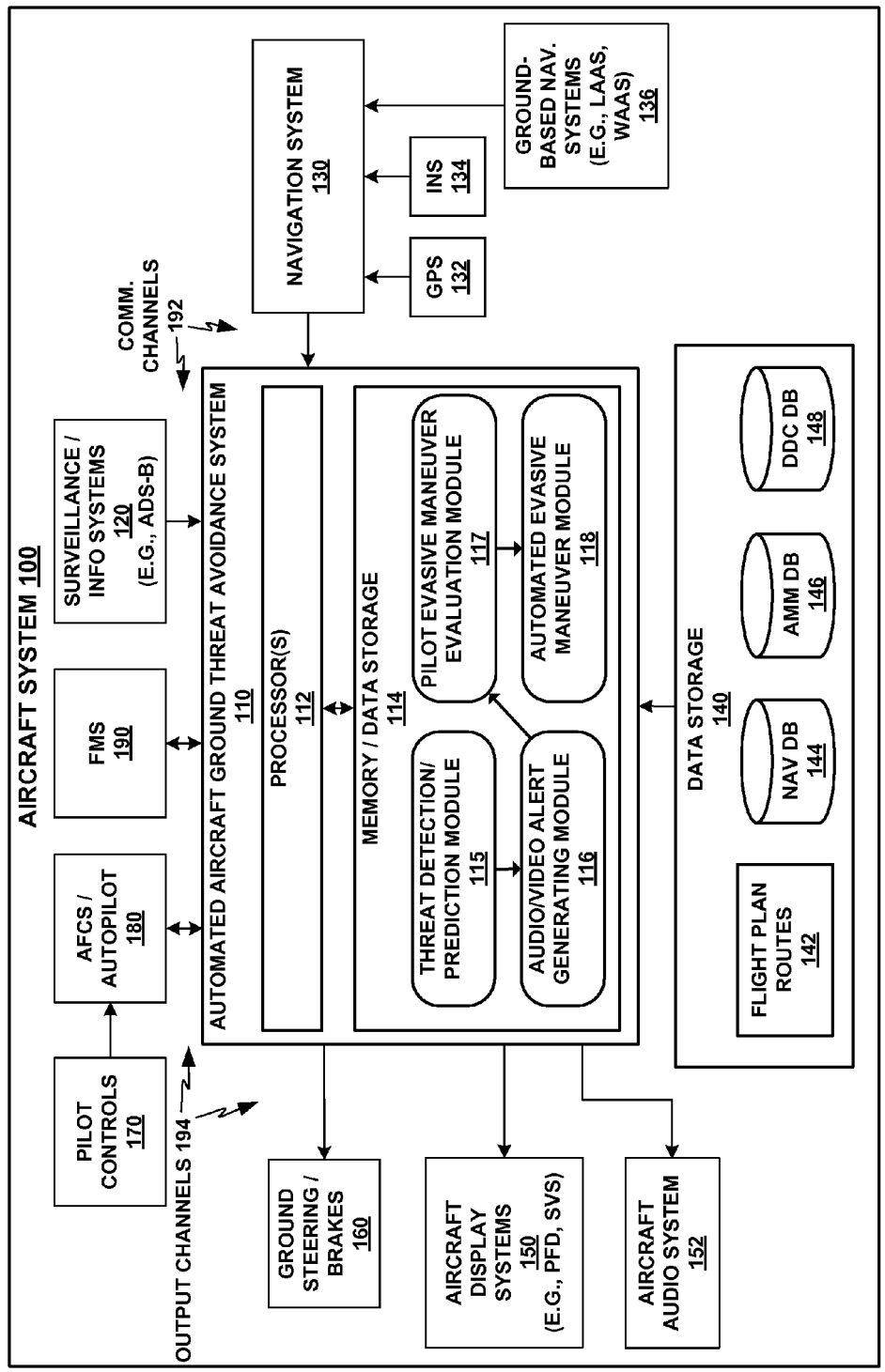
FIG. 1 depicts a conceptual block diagram of an aircraft system that includes an automated aircraft ground threat avoidance system operatively connected to other aircraft subsystems, in one example.

FIG. 1 depicts a conceptual block diagram of an aircraft system 100 that includes an automated aircraft ground threat avoidance system 110 operatively connected to other aircraft subsystems, in one example. Automated aircraft ground threat avoidance system 110 ("automated threat avoidance system 110") is operatively connected, via communication channels 192 and/or output channels 194 (e.g., a system bus), to one or more surveillance and/or information systems 120, navigation system 130, data storage system 140, aircraft display systems 150, aircraft audio system 152, ground steering and brakes 160, pilot controls 170, Automatic Flight Control System (AFCS)/autopilot 180, and flight management system (FMS) 190. Additional details in accordance with illustrative examples of aircraft system 100 of FIG. 1 are further described as follows.

Automated threat avoidance system 110 includes one or more processors 112 connected to one or more memory and/or data storage devices 114, on which various modules 115-118 comprising executable instruction code may be loaded and/or stored. These may include a threat detection/prediction module 115, an audio/video alert generating module 116, a pilot evasive maneuver evaluation module 117, and an automated evasive maneuver module 118 are loaded and/or stored for execution by the one or more processors 112. While FIG. 1 depicts modules 115-118 loaded on memory and/or data storage devices 114, in some implementations, any one or more of modules 115-118 may be implemented as portions of a single software application, separate software applications, separate or interrelated software libraries, separate hardware elements that may store or execute separate software or firmware, and/or separate hardware systems. Automated threat avoidance system 110 may thereby be configured to detect or predict threats of potential dangers (potential incursions, trajectory excursions, or collisions), generate an alert of the threat via aircraft display systems 150 and/or aircraft audio system 152, evaluate evasive maneuvers performed via pilot controls 170, determine if the evasive maneuvers performed via pilot controls 170 are sufficient to avoid a detected or predicted threat, and in response to determining that the evasive maneuvers performed via pilot controls 170 are not sufficient to avoid the threat, control the aircraft to perform an automated evasive maneuver.

Surveillance/information systems 120 may be or include an ADS-B system. Surveillance/information systems 120 may also be or include other traffic information sources such as an Automated Dependent Surveillance—Re-Broadcast (ADS-R) system, a Traffic Information Service—Broadcast (TIS-B) system, an onboard radar system, an onboard optical detection system, an onboard ultrasound detection system, an onboard lidar system, or a system configured to receive information from an airport-based ground surface monitoring system, for example. Automated threat avoidance system 110 may receive information and/or data from surveillance/information systems 120 that enable automated threat avoidance system 110 to detect aircraft, ground vehicles, or other obstacles on a runway or taxiway.

For example, automated threat avoidance system 110 may obtain aircraft state data from ADS-B, ADS-R, TIS-B, or other surveillance/information systems 120 for other airport traffic including parameters such as groundspeed, heading, altitude, and rate of climb or descent. In other examples, surveillance/information systems 120 may directly detect aircraft, ground vehicles, or other obstacles using onboard radar, optical detection, ultrasound, lidar, or other detection system. Automated threat avoidance system 110 may receive information and/or data from surveillance/information systems 120 that enable automated threat avoidance system 110 to predict, from the positions and motions of aircraft, ground vehicle, or other obstacle in the relevant vicinity, that the obstacle is likely to encroach on a runway or taxiway at a time when it may pose a threat to the ownship. For example, this may include detecting another aircraft occupying the intended landing runway while the ownship is on approach for landing, or detecting other close-by ground traffic during taxiing.

Navigation system 130 is operatively connected to various navigation subsystems, such as Global Positioning System (GPS) unit 132, Inertial Navigation System (INS) unit 134, and ground-based navigation systems 136. Ground-based navigation systems 136 may include a Local Area Augmentation System (LAAS) receiver unit and a Wide Area Augmentation System (WAAS) receiver unit, for example. Automated threat avoidance system 110 may receive information and/or data on the ownship's position and velocity from navigation system 130.

Data storage system 140 includes flight plan routes 142, navigation database 144, Airport Moving Map (AMM) database 146, and Data Driven Charts (DDC) database 148. AMM database 146 may be part of or connected to a two-dimensional (2D) or three-dimensional (3D) airport moving map display (AMMD) system. An AMMD system may be included in aircraft display systems 150, and may provide 2D or 3D computer-generated graphic displays of an airport, centered on or from the perspective of the ownship. DDC database may be part of a Data Driven Charts (DDC) system, which may electronically provide published approach and missed approach procedures for selected runways.

Automated threat avoidance system 110 may receive information and/or data on the ownship's flight plan route and navigation, including on natural fixed obstacles such as mountains, from flight plan routes 142 and/or navigation database 144. Automated threat avoidance system 110 may also receive information and/or data on airport runway and taxiway positions, and on structures and other fixed obstacles at airports, front AMM database 146. Automated threat avoidance system 110 may also receive information and/or data on published approach and missed approach procedures for selected runways front DDC database 148, which automated threat avoidance system 110 may draw from for planning or implementing an automated evasive maneuver such as a missed approach procedural trajectory specific to a selected runway.

Aircraft display systems 150 may include a primary flight display (PFD), a Navigation Display (ND) system, a Head-Up Display (HUD), and a Synthetic Vision System (SVS), for example. Aircraft display systems 150 may include capabilities for displaying AMM display outputs and DDC display outputs, as indicated above. When automated threat avoidance system 110 detects or predicts a threat, automated threat avoidance system 110 may generate audio alert outputs to aircraft audio system 152 and/or video alert outputs to one or more of aircraft display systems 150 indicating the detected threat (for purposes of this disclosure, "detected" threats may collectively refer to either detected or predicted threats), aircraft display systems 150 and aircraft audio system 152 may be considered part of the cockpit systems of the ownship.

Pilot controls 170 may include a control column, rudder controls, flight control panel, throttle controls, and other instruments that may enable a pilot of the ownship to perform manual actions to control the engines, flight control surfaces, and ground wheel steering and brakes 160, and to implement functions of autopilot 180. Automated threat avoidance system 110 may detect and evaluate actions performed via pilot controls 170. Automated threat avoidance system 110 may determine whether actions performed via pilot controls 170 control the ownship to perform a sufficient evasive maneuver for the ownship to avoid a detected ground surface threat, within a selected threshold after automated threat avoidance system 110 has outputted an alert of the ground surface threat via aircraft display systems 150, aircraft audio system 152, and/or other cockpit systems of the ownship.

In one example, automated ground threat avoidance system 110 may commence monitoring for traffic conflicts or other threats of incursions, trajectory excursions, or potential collisions when the ownship is on approach toward an airport and at about 300 meters (~984 feet) above field elevation, and approximately five kilometers (~3.1 miles) from the runway threshold for a normal Instrument Landing System (ILS) approach. However, these parameters may vary as a function of the type of approach and the approach geometry being flown. For taxiing on airport runways and taxiways, automated threat avoidance system 110 may monitor traffic and/or structures and objects within a nominal radius of, e.g., 150 meters (~492 feet) of the ownship.

Automated ground threat avoidance system 110 may predict the trajectory of an intruding aircraft using state data received via surveillance/information systems 120. Automated ground threat avoidance system 110 may perform a prediction that is time-based, distance-based, or a combination of the two. Automated ground threat avoidance system 110 may predict points of conflict between the path of the ownship and the intruding aircraft. For example, a time-based prediction may include predicting a conflict with other traffic based on a selected time interval, such as a 30 second time period for a caution alert and a 15 second time period for a warning alert. The intruding traffic may be on a runway or a taxiway, whereas the ownship may be either on final approach or taxiing. Automated ground threat avoidance system 110 or aircraft alerting subsystem may provide audio and/or visual alerts to the flight crew via aircraft display systems 150 or aircraft audio system 152.

After the threat alert, automated ground threat avoidance system 110 may determine whether there is a change in trajectory of the ownship by the pilot following a selected discrete threshold, e.g., an interval of time, a threshold of distance traveled, a threshold of separation distance or separation time between the ownship and the object of the threat, a threshold of altitude loss during approach or other altitude change, a vertical speed threshold, or a combined threshold incorporating two or more criteria of time, distance traveled, separation distance, vertical speed, and/or altitude change. If automated ground threat avoidance system 110 determines that the pilot does not perform, within the selected threshold, a maneuver sufficient to avoid the threat, automated ground threat avoidance system 110 may perform an automated avoidance maneuver. In an automated avoidance maneuver, automated ground threat avoidance system 110 may enter, initiate, or perform commands to control the motion of the ownship in an automated process under control of automated ground threat avoidance system 110 and independently of affirmative pilot actions via pilot controls 170.

In one example of an automated avoidance maneuver during an approach to landing, automated ground threat avoidance system 110 may automatically execute a missed approach procedure. Automated ground threat avoidance system 110 may access the FMS and/or the DDC system, both of which may include the information or capability for performing a missed approach procedure. Automated ground threat avoidance system 110 may execute a missed approach procedure by engaging a Takeoff/Go-around (TOGA) mode, or otherwise throttling up or increasing the thrust of the engines, and/or making control system changes, e.g., changes to positions of one or more flaps, elevators, ailerons, and/or landing gear of the aircraft. In some examples, automated ground threat avoidance system 110 may execute a missed approach procedure by automatically controlling the engines and flight surfaces of the aircraft, e.g., via autopilot 180, to pursue a procedural go-around trajectory maneuver in accordance with a procedural trajectory indicated by navigation database 144 or DDC database 148. In some examples, automated ground threat avoidance system 110 may execute an evasive maneuver based on a calculated trajectory that provides a maximum separation from an intruder aircraft.

For examples in which both the ownship and an intruder aircraft are taxiing, and the aircraft systems predict a conflict and provide a flight deck alert (or alert via one or more cockpit systems of the ownship), and automated ground threat avoidance system 110 does not detect a positive application of braking or nose wheel steering within a selected threshold (e.g., of time or distance), automated ground threat avoidance system 110 may automatically apply ground steering/brakes 160, e.g., the brakes and/or steering on a nose wheel of the ownship, to avoid loss of safe separation between the ownship and the intruder aircraft. Automated ground threat avoidance system 110 may determine a direction of steering to enhance or maximize threat avoidance, and in doing so, may take into account information on the geometry of the proximate runways, taxiways, taxiway centerlines, hold-short locations, etc. In the vicinity of the ownship. Automated ground threat avoidance system 110 may access this proximate taxiway and runway information from AMM database 146, from an imaging system on the ownship or other surveillance/information systems 120, or from another source.

During or after automated ground threat avoidance system 110 performing an automated threat avoidance maneuver, automated ground threat avoidance system 110 may determine whether the threat has been sufficiently avoided. In some examples, automated ground threat avoidance system 110 may continue performing an automated threat avoidance maneuver until it has determined that the threat has been sufficiently avoided, or has determined that the pilot has taken over performing a sufficient threat avoidance maneuver via pilot controls 170. Once automated ground threat avoidance system 110 has determined that the threat has been sufficiently avoided or that the ownship has exited the threat envelope, automated threat avoidance system 110 may generate a clear-of-conflict alert via aircraft display systems 150 or aircraft audio system 152.

Automated threat avoidance system 110 may issue visual alerts for output in a 2D and/or 3D AMM display, such as in a Navigation Display (ND), PFD, or HUD in aircraft display systems 150. Automated threat avoidance system 110 may issue audio and/or visual alert messages such as "RUNWAY TRAFFIC, GO-AROUND" in an airborne landing approach example, or "TRAFFIC AHEAD, BRAKE" in a taxiing example. Automated threat avoidance system 110 may generate outputs to aircraft display systems 150, e.g., to a PFD or HUD, an enhanced landing view system, or an ND system, to depict or indicate a runway as unavailable for landing or for taxiing onto due to a current, impending, or predicted incursion, excursion, or collision threat.

Automated threat avoidance system 110 may provide various features to avoid runway or taxiway incursion, excursion, and collision threats, and enhance collision avoidance in airport terminal operations. When an aircraft approaches a runway for landing, automated threat avoidance system 110 may alert the pilot of any probable runway incursion due to an aircraft or a ground vehicle, and in response to insufficient pilot action, automated threat avoidance system 110 may automatically initiate an avoidance maneuver, such as a TOGA mode, to fly the aircraft in accordance with the associated missed approach procedure.

During taxiing, automated threat avoidance system 110 may predict the movement of other aircraft or ground vehicles that might result in probable conflict, and alert the flight crew. Then, if automated threat avoidance system 110 does not detect pilot action to resolve the conflict within the selected threshold, automated threat avoidance system 110 may automatically apply the brakes or steer away to avoid a collision or other potential threat.

Figure 2:
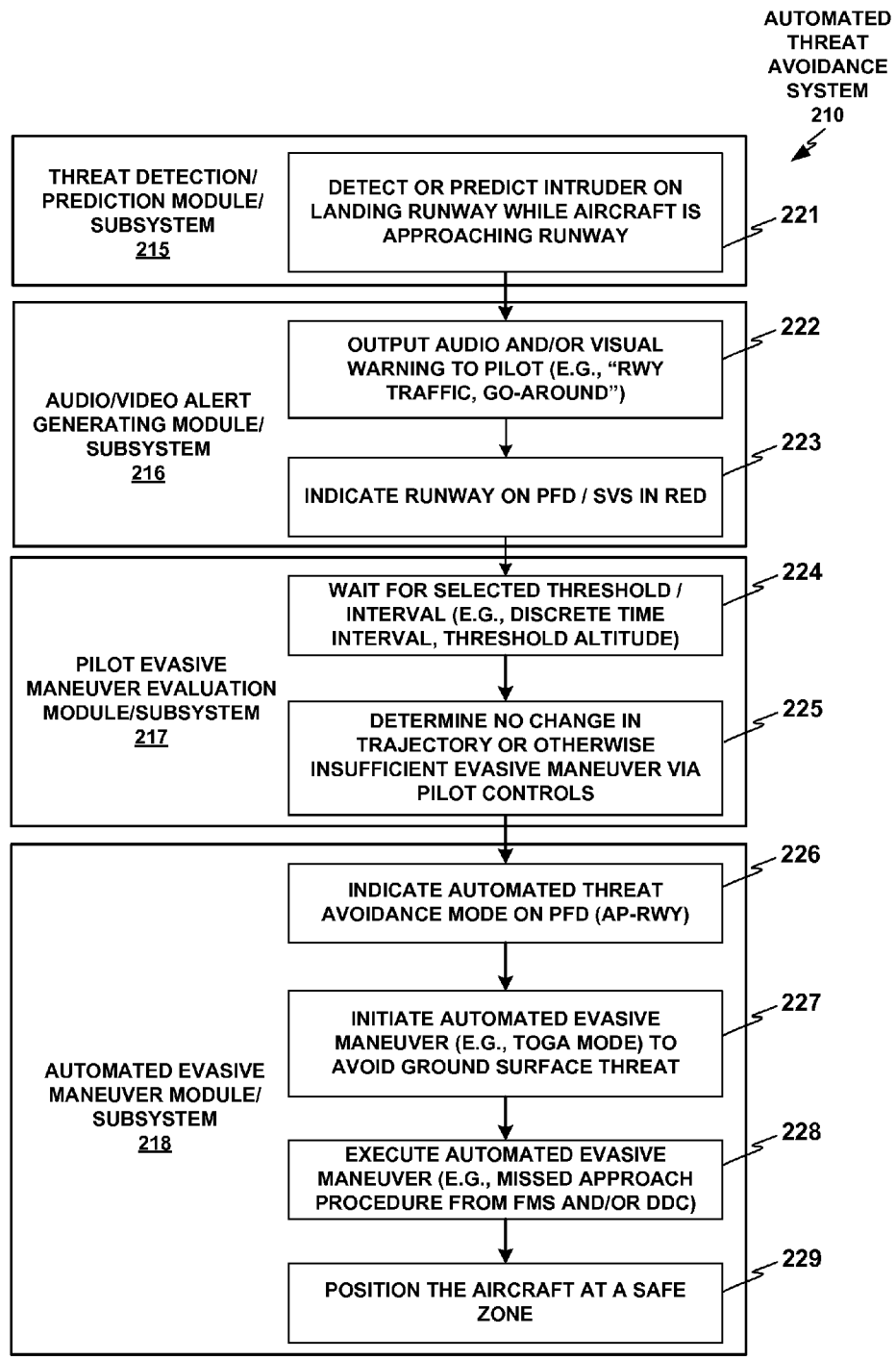
FIG. 2 shows an example automated threat avoidance system performing an automated aircraft ground threat avoidance process for avoiding a potential threat of incursion on the runway while the aircraft is on approach for landing, in accordance with aspects of this disclosure.

FIG. 2 shows an example automated threat avoidance system 210 performing an automated aircraft ground threat avoidance process for avoiding a potential threat of incursion on the runway while the aircraft is on approach for landing, in accordance with aspects of this disclosure. In this example, automated threat avoidance system 210 includes threat detection/prediction module or subsystem ("module/subsystem") 215, audio/video alert generating module or subsystem 216, pilot evasive maneuver evaluation module or subsystem 217, and automated evasive maneuver module or subsystem 218. Module/subsystems 215-218 may be implemented as software modules (e.g., portions of a single software application, separate software applications or libraries executing on one or more processors on a unitary hardware unit or separate hardware units), as separate hardware subsystems, or any combination thereof.

As the aircraft (the ownship on which automated threat avoidance system 210 is implemented) approaches the runway for landing, threat detection/prediction module/subsystem 215 may detect or predict an intruder (e.g., another aircraft, a ground vehicle) on the landing runway (221). Audio/video alert generating module/subsystem 216 may output an audio alert and/or a visual alert or warning to the pilot (222) via cockpit systems of the aircraft such as a PFD, HUD, an SVS, an enhanced runway taxiing and landing imaging and alerting subsystem. For example, audio/video alert generating module/subsystem 216 may generate a visual warning alert onscreen superimposed on a landing imaging system on a PFD, HUD, or SVS that reads, e.g., "RWY TRAFFIC, GO-AROUND." Audio/video alert generating module/subsystem 216 may generate the visual warning alert in bright red or in another bright color that contrasts highly with the landing image background. Audios/video alert generating module/subsystem 216 may also indicate the runway in red or other brightly contrasting color on the PFD, HUD, or SVS. For example, the PFD may show an image of the runway from the perspective of the cockpit, and audio/video alert generating module/subsystem 216 may superimpose or overlay a bright red outline or silhouette over the image of the runway, and that may be maintained aver the image of the runway as the ownship flies. An example of this is shown in FIG. 3, while additional aspects of FIG. 2 are described further below.

Figure 3:
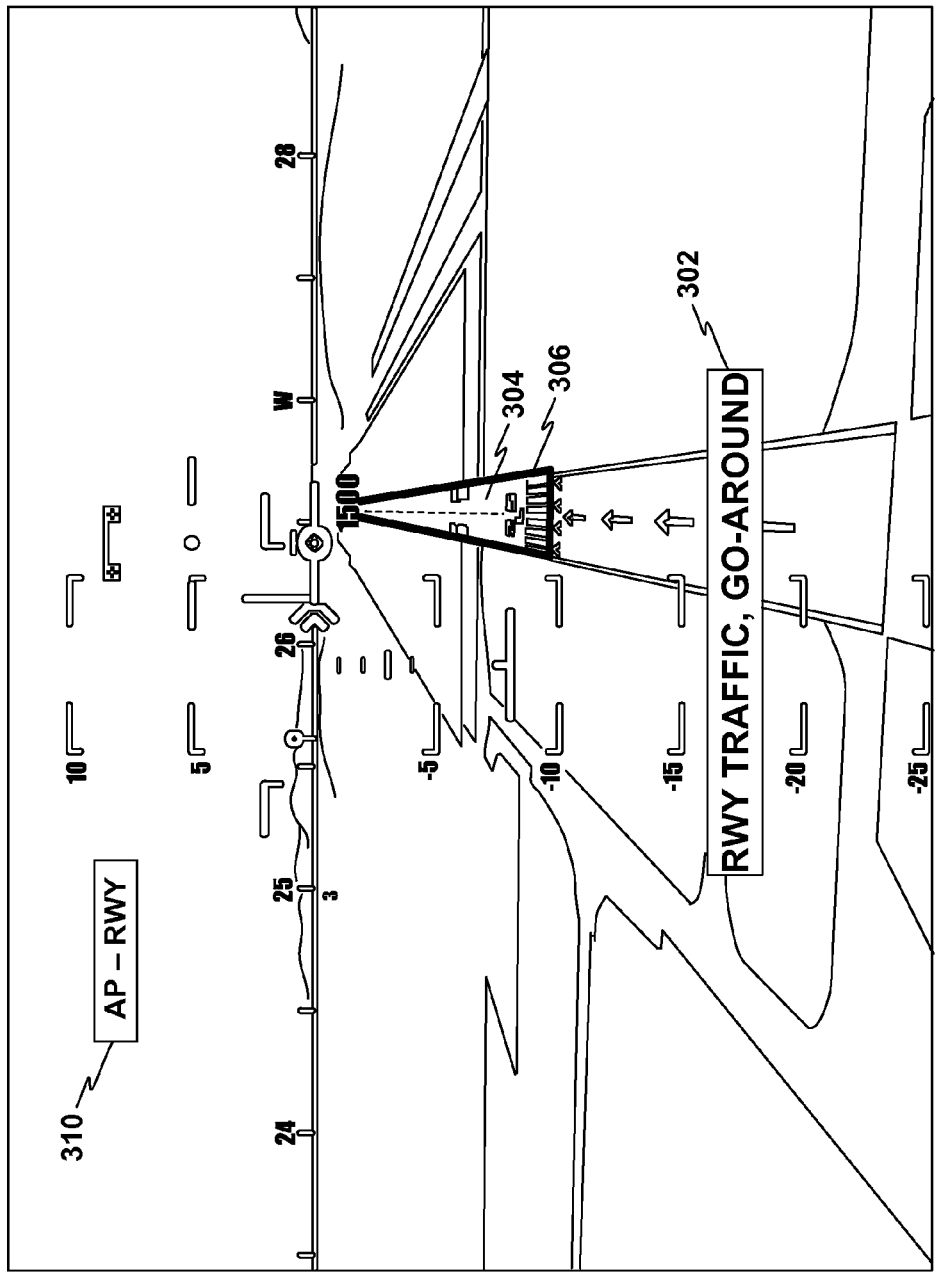
FIG. 3 shows an example Primary Flight Display (PFD) image showing an image of a runway from the perspective of the ownship cockpit as the ownship is approaching for a landing on the runway, with a warning alert and a superimposed outline over the runway image as generated by an audio and/or video alert generating module or subsystem, in accordance with aspects of this disclosure.

FIG. 3 shows an example PFD or HUD image 300 ("PFD/HUD image 300") showing a runway image 304 front the perspective of the ownship cockpit as the ownship is approaching for a landing on the runway, with a warning alert 302 and a superimposed outline 306 over the runway image 304 as generated by audio/video alert generating module/subsystem 116 of 216, in accordance with aspects of this disclosure. PFD/HUD image 300 may be generated in a PFD or in a HUD as part of aircraft display systems 150 of aircraft system 100 of FIG. 1, in some examples. PFD/HUD image 300 includes a prominently positioned visual warning alert 302 generated by audio/video alert generating module/subsystem 116/216 that reads "RWY TRAFFIC, GO-AROUND," and that may be rendered in a bright red color. PFD/HUD image 300 also includes a prominent, bright superimposed outline 306 generated by audio/video alert generating module/subsystem 116/216 superimposed over the runway image 304, which may also be rendered in a bright red color, as an additional form of alert.

Returning to FIG. 2, pilot evasive maneuver evaluation module/subsystem 217 may wait for a selected threshold or interval (e.g., a discrete time interval, a threshold altitude above the runway) (224) while pilot evasive maneuver evaluation module/subsystem 217 evaluate actions performed via pilot controls. This evaluating may include pilot evasive maneuver evaluation module/subsystem 217 determining whether a sufficient evasive maneuver for the aircraft to avoid the detected ground surface threat is performed via the pilot controls of the aircraft within the selected threshold after the alerts 302, 306 (and/or an audio alert) of the ground surface threat has been outputted via the cockpit systems of the aircraft. For example, if the pilot controls the aircraft to enter a TOGA mode and/or to break out of the landing procedure and control the aircraft to enter a fly-around trajectory, to begin leveling off or raising altitude again and to begin circling around the airport, pilot evasive maneuver evaluation module/subsystem 217 may determine that sufficient action has been taken via the pilot controls to evade the detected incursion threat on the runway. Pilot evasive maneuver evaluation module/subsystem 217 may then remove or cease the alerts and quit evaluating the actions performed via the pilot controls (at least for the time being). However, if pilot evasive maneuver evaluation module/subsystem 217 determines that no change in the landing approach trajectory are performed via the pilot controls, or that certain actions are performed via the pilot controls but that they are insufficient to alter the aircraft's landing approach trajectory toward the runway with the incursion threat (225), within the selected threshold, pilot evasive maneuver evaluation module/subsystem 217 may then activate or trigger the automated evasive maneuver module or subsystem 218. This module may also take into account any evasive maneuver initiated by the threat aircraft or ground vehicle, and may adjust or alter a selected automated evasive maneuver to avoid an updated determination of the trajectory of the threat aircraft or ground vehicle.

Once activated or triggered, automated evasive maneuver module or subsystem 218 may indicate on the PFD or HUD that automated threat avoidance system 210 is entering an automated threat avoidance mode (226), initiate an automated evasive maneuver to avoid the ground surface threat (227), and execute the automated evasive maneuver (228). The indication of engaging the automated threat avoidance mode may be in the form of a visual icon or text block generated on or outputted to the PFD or HUD, illustratively shown as text block 310 (only generated after warning alert 302 and after automated threat avoidance mode is initiated) in PFD/HUD image 300 in FIG. 3.

In some examples, initiating and executing the automated evasive maneuver may include initiating the TOGA mode, potentially conditionally on automated evasive maneuver module or subsystem 218 determining or confirming that entering TOGA mode will constitute a sufficient avoidance maneuver. In some examples, initiating and executing the automated evasive maneuver may include engaging the autopilot to control the aircraft to enter a procedural flight path for a go-around maneuver. In some examples, initiating and executing the automated evasive maneuver may take the form of determining a satisfactory or optimized trajectory for an evasive maneuver based on various criteria such as the airport layout, local terrain or obstacles, trajectories of other proximate air traffic, and/or the nature, position, velocity, predicted duration, or other state of the detected incursion threat or other ground surface threat on the runway, and controlling the aircraft to pursue that determined trajectory.

By initiating and/or executing the automated evasive maneuver, automated threat avoidance system 210 may position the aircraft at a safe zone (229) in which the aircraft avoids the detected threat. This may include positioning the aircraft in a go-around trajectory around the airspace of the airport for a later landing approach on the same runway after the detected threat has dispersed, or for a landing approach on a different runway, for example.

Figure 4:
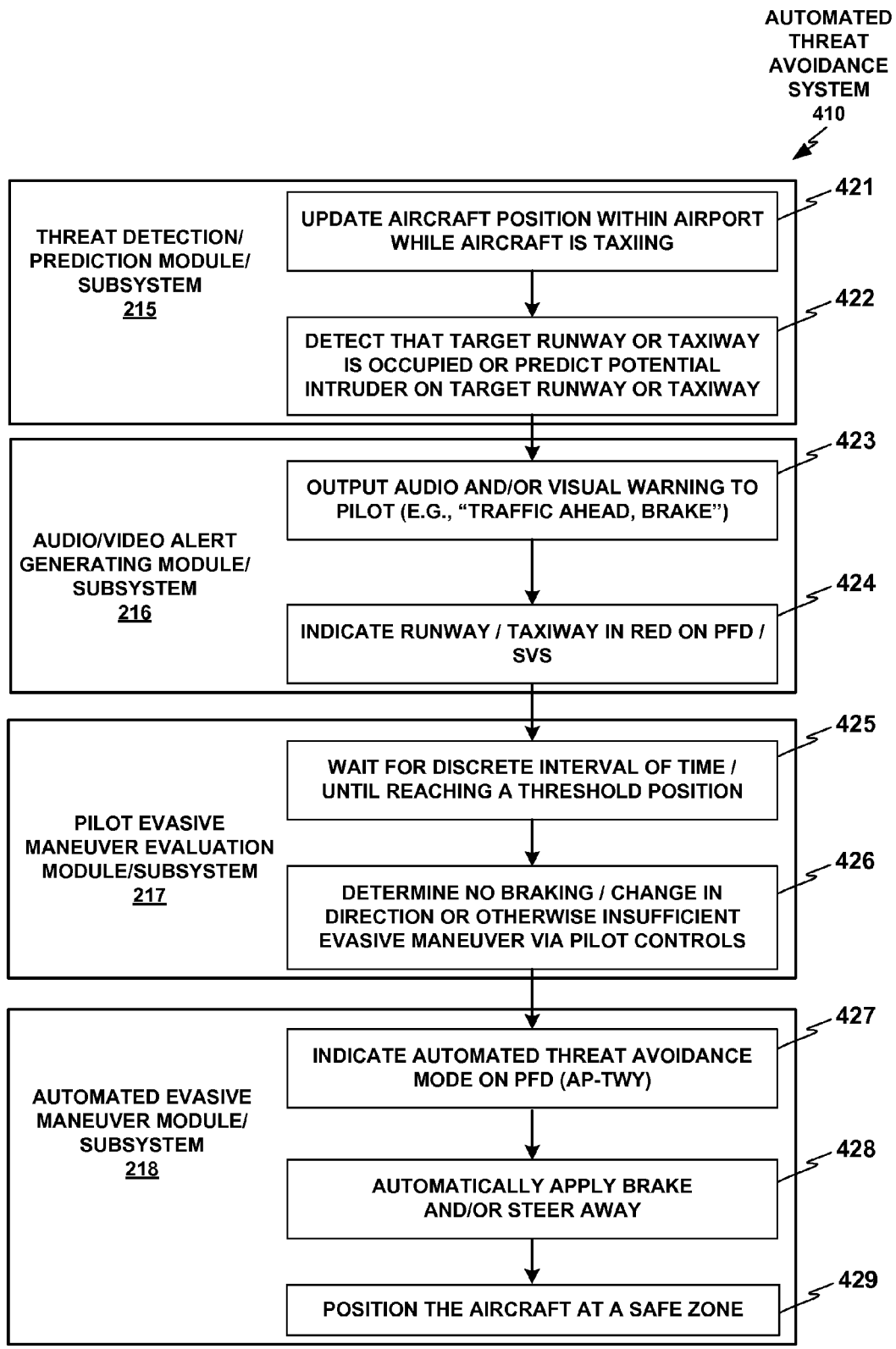
FIG. 4 shows an example automated threat avoidance system performing an automated aircraft ground threat avoidance process for avoiding a potential threat of collision on a runway or taxiway while an aircraft is taxiing around an airport, in accordance with aspects of this disclosure.

FIG. 4 shows an example automated threat avoidance system 410 performing an automated aircraft ground threat avoidance process for avoiding a potential threat of collision on a runway or taxiway while an aircraft is taxiing around an airport, in accordance with aspects of this disclosure. In this example as well, automated threat avoidance system 410 includes threat detection/prediction module/subsystem 215, audio/video alert generating module or subsystem 216, pilot evasive maneuver evaluation module or subsystem 217, and automated evasive maneuver module or subsystem 218. As the aircraft taxis on a taxiway toward a runway, threat detection/prediction module/subsystem 215 may update and track the aircraft position within the airport (421), and detect or predict an intruder (e.g., another aircraft, a ground vehicle) on the runway, or taxiway, or other airport surface (422). Audio/video alert generating module/subsystem 216 may output an audio and/or visual alert or warning to the pilot (423) via cockpit systems of the aircraft such as a PFD, HUD, an SVS, an enhanced runway taxiing and landing imaging and alerting subsystem.

For example, audio/video alert generating module/subsystem 216 may generate a visual warning alert onscreen superimposed on a landing imaging system on a PFD, HUD, or SVS that reads, e.g., "TRAFFIC AHEAD, BRAKE." Audio/video alert generating module/subsystem 216 may generate the visual warning alert in bright red or in another bright color that contrasts highly with the landing image background, and may also indicate the runway in red or other brightly contrasting color on the PFD, HUD, or SVS (424). An example of this is shown in FIG. 5, while additional aspects of FIG. 4 are described further below.

Figure 5:
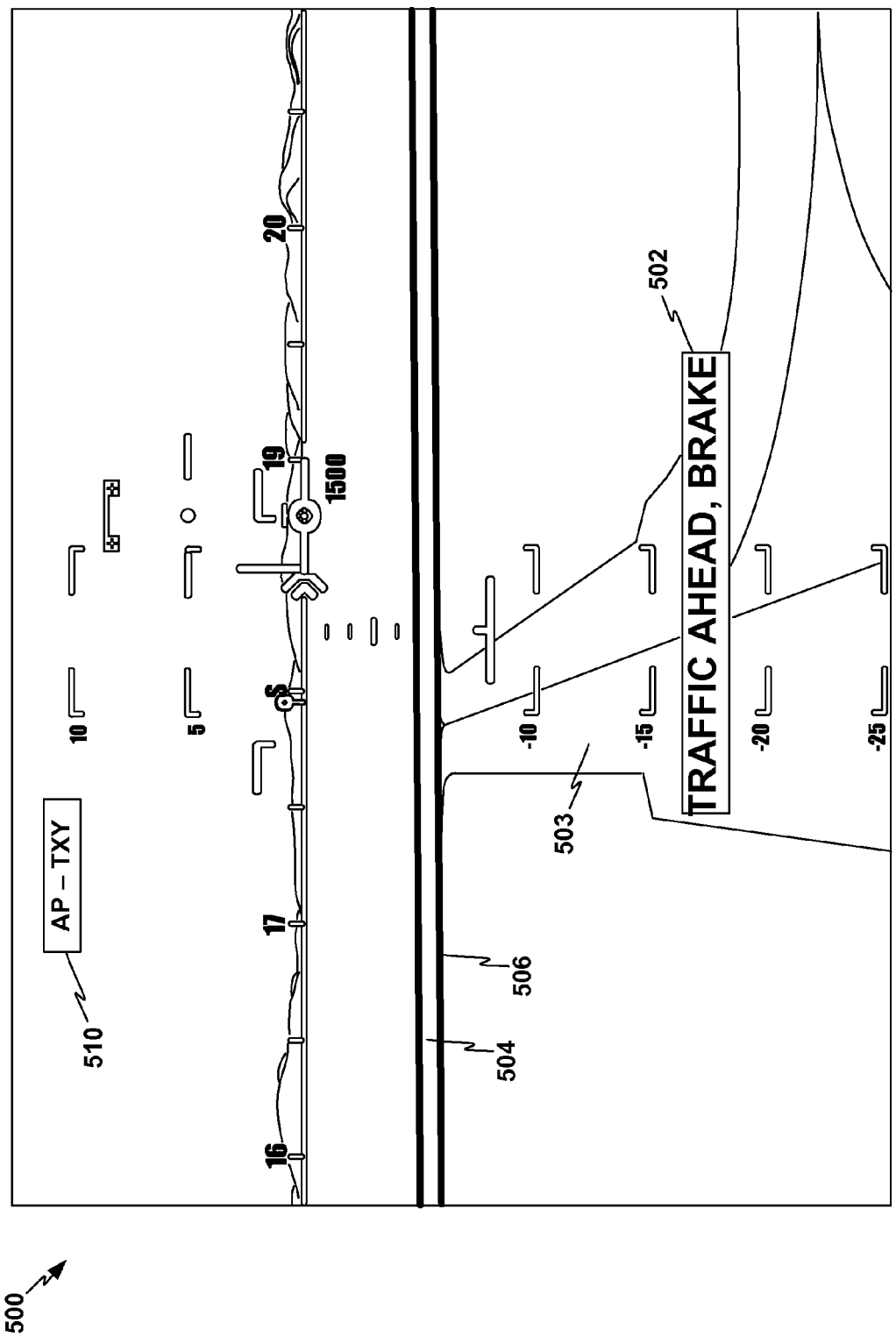
FIG. 5 shows an example PFD image showing images of a taxiway and a runway from the perspective of the ownship cockpit as the ownship is taxiing along the taxiway toward the runway, with a warning alert and a superimposed outline over the runway image as generated by an audio and/or video alert generating module or subsystem, in accordance with aspects of this disclosure.

FIG. 5 shows an example PFD/HUD image 500 showing a taxiway image 503 and runway image 504 front the perspective of the ownship cockpit as the ownship is taxiing along the taxiway toward the runway, with a warning alert 502 and a superimposed outline 506 over the runway image 504 as generated by audio/video alert generating module/subsystem 116 or 216, in accordance with aspects of this disclosure. PFD/HUD image 500 may be generated in a PFD or in a HUD as part of aircraft display systems 150 of aircraft system 100 of FIG. 1, in some examples. PFD/HUD image 500 includes a prominently positioned visual warning alert 502 generated by audio/video alert generating module/subsystem 116/216 that reads "TRAFFIC AHEAD, BRAKE," and that may be rendered in a bright red color. PFD/HUD image 500 also includes a prominent, bright superimposed outline 506 generated by audio/video alert generating module/subsystem 116/216 superimposed over the runway image 504, which may also be rendered in a bright red color, as an additional form of alert. In other examples, automated threat avoidance system 410 may detect a threat on a taxiway or other airport surface, and superimpose a warning outline around a corresponding taxiway image section as a warning to the pilot of the threat in that section of the taxiway or other corresponding airport surface.

Returning to FIG. 4, analogously to the example of FIG. 2, pilot evasive maneuver evaluation module/subsystem 217 may wait for a selected threshold or interval (e.g., a discrete lime or distance interval deceleration threshold, heading change threshold) (425) while it evaluates actions performed via pilot controls. This evaluating may include pilot evasive maneuver evaluation module/subsystem 217 determining whether a sufficient evasive maneuver for the aircraft to avoid the detected ground surface threat is performed via the pilot controls of the aircraft within the selected threshold after the alerts 502, 506 (and/or an audio alert) of the ground surface threat has been outputted via the cockpit systems of the aircraft.

For example, if the pilot controls the aircraft to apply the brakes and stop or decelerate sufficiently, or steer the aircraft away from the runaway containing the threat, such as along a different taxiway not heading toward the runway, pilot evasive maneuver evaluation module/subsystem 217 may determine that sufficient action has been taken via the pilot controls to evade the detected incursion threat on the runway. Pilot evasive maneuver evaluation module/subsystem 217 may then remove or cease the alerts and quit evaluating the actions performed via the pilot controls (at least for the time being). However, if pilot evasive maneuver evaluation module/subsystem 217 determines that no change in the taxiing trajectory is performed via the pilot controls, or that certain actions are performed via the pilot controls but that they are insufficient to alter the aircraft's taxiing toward the runway with the incursion threat (426) within the selected threshold, pilot evasive maneuver evaluation module/subsystem 217 may then activate or trigger the automated evasive maneuver module or subsystem 218.

Once activated or triggered, automated evasive maneuver module or subsystem 218 may indicate on the PFD or HUD that automated threat avoidance system 410 is entering an automated threat avoidance mode (427), and execute an automated evasive maneuver to control the aircraft to avoid the threat, such as by automatically applying the brakes and/or steering the aircraft away from the threat (428). The indication of engaging the automated threat avoidance mode may be in the form of a visual icon or text block generated on or outputted to the PFD or HUD, illustratively shown as text block 510 (only generated after warning alert 502 and after automated threat avoidance mode is initiated) in PFD/HUD image 500 in FIG. 5.

During or after automated evasive maneuver module or subsystem 218 performing an automated threat avoidance maneuver, automated evasive maneuver module or subsystem 218 may determine whether the threat has been sufficiently avoided. In some examples, automated evasive maneuver module or subsystem 218 may continue performing an automated threat avoidance maneuver until it has determined that the threat has been sufficiently avoided, or has determined that the pilot has taken over performing a sufficient threat avoidance maneuver via pilot controls 170. Once automated evasive maneuver module or subsystem 218 has determined that the threat has been sufficiently avoided or that the ownship has exited the threat envelope, automated evasive maneuver module or subsystem 218 may generate a clear-of-conflict alert via aircraft display systems 150 or aircraft audio system 152.

Automated evasive maneuver module or subsystem 218 may continue performing the automated evasive maneuver until it has determined that it has placed the aircraft in a safe zone (429) in which automated evasive maneuver module or subsystem 218 determines that the aircraft avoids the detected threat. At this point, automated evasive maneuver module or subsystem 218 may bring the aircraft to a stop in the safe zone, such as at a safe position to the side of a taxiway off of any runway and out of the path of taxiway traffic, ready for the pilot or other personnel to resume control, for example.

Figure 6:
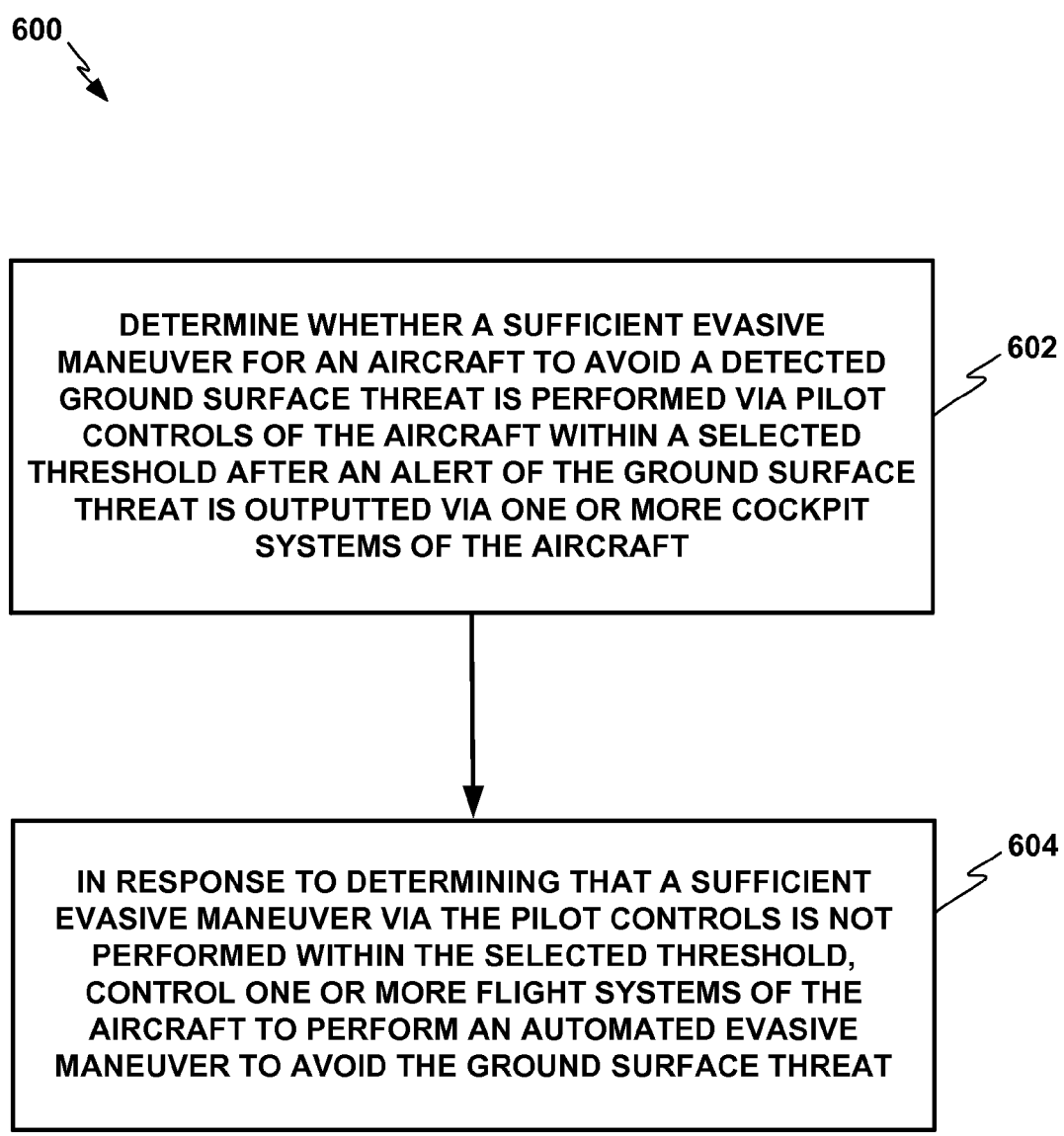
FIG. 6 depicts a flowchart for an example process that an automated threat avoidance system may implement for avoiding threats to an aircraft, in accordance with illustrative aspects of this disclosure.

FIG. 6 depicts a flowchart for an example process 600 that automated threat avoidance system 110, 210, 410 may implement for avoiding threats to an aircraft, in accordance with illustrative aspects of this disclosure. In this example, process 600 includes determining, by one or more processing devices (e.g., one or more processors of automated threat avoidance system 110 executing pilot evasive maneuver evaluation module 117 loaded and/or stored on memory/data storage 114), whether a sufficient evasive maneuver for an aircraft to avoid a detected ground surface threat is performed via pilot controls (e.g., pilot controls 170) of the aircraft within a selected threshold (e.g., of time, altitude, distance) after an alert of the ground surface threat is outputted via one or more cockpit systems (e.g., aircraft display systems 150, aircraft audio system 152) of the aircraft (602). Process 600 further includes, in response to determining that a sufficient evasive maneuver via the pilot controls is not performed within the selected threshold, controlling, by the one or more processing devices, one or more flight systems of the aircraft (e.g., autopilot 180 FMS 190, ground steering/brakes 160) to perform an automated evasive maneuver to avoid the ground surface threat (604).

Any of a wide variety of processing devices or other central processing units, ASICs, graphical processing units, computing devices, or processing devices of any other type may perform process 600 or portions or aspects thereof. One or more processors 112, memory/data storage 114, and/or other components of automated threat avoidance system systems 110, 210, 410 as disclosed above may be implemented in any of a variety of types of circuit elements. For example, processors or other components of automated threat avoidance system systems 110, 210, 410 may be implemented as one or more ASICs, as a magnetic nonvolatile random-access memory (RAM) or other types of memory, a mixed-signal integrated circuit, a central processing unit (CPU), a field programmable gate array (FPGA), a microcontroller, a programmable logic controller (PLC), a system on a chip (SoC), a subsection of any of the above, an interconnected or distributed combination of any of the above, or any other type of component or one or more components capable of being configured to determine lack of pilot action to perform a sufficient threat avoidance maneuver, to implement an automated threat avoidance maneuver, and perform other functions in accordance with any of the examples disclosed herein.

Functions executed by electronics associated with the devices systems described herein may be implemented, at least in part, by hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included in components of automated threat avoidance system systems 110, 210, 410 or other systems described herein. The terms "processor," "processing device," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure, in addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to the devices and systems described herein may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be non-transitory.

Any of the described units, modules or components may be implemented together or separately as discrete but interoperable logic devices. Depiction of different features as separate processors, modules, or units is intended to highlight different functions and does not necessarily imply that such processors, modules, or units must be realized by separate hardware or software components. Rather, functionality associated with one or more modules or units may be performed by separate hardware or software components, or integrated within common or separate hardware or software components.

Various aspects of the disclosure have been described. These and other aspects are within the scope of the following claims.

What is claimed is:

1. A method comprising:
   determining, by one or more processing devices, whether a sufficient evasive maneuver for an aircraft to avoid a detected ground surface threat is performed via pilot controls of the aircraft within a selected threshold of distance after an alert of the ground surface threat is outputted via one or more cockpit systems of the aircraft; and
   in response to determining that a sufficient evasive maneuver via the pilot controls is not performed within the selected threshold of distance, controlling, by the one or more processing devices, one or more flight systems of the aircraft to perform an automated evasive maneuver to avoid the ground surface threat.

2. The method of claim 1, further comprising:
   prior to the determining whether the sufficient evasive maneuver for the aircraft to avoid the detected ground surface threat is performed via the pilot controls, detecting, by the one or more processing devices, the ground surface threat to the aircraft during a landing, taxiing, or takeoff of the aircraft.

3. The method of claim 1, further comprising:
   prior to the determining whether the sufficient evasive maneuver for the aircraft to avoid the detected ground surface threat is performed via the pilot controls, generating, by the one or more processing devices, the alert of the ground surface threat via the one or more cockpit systems of the aircraft.

4. The method of claim 1, wherein controlling the one or more flight systems of the aircraft to perform the automated evasive maneuver to avoid the ground surface threat comprises controlling, by the one or more processing devices, engines of the aircraft to enter a Takeoff/Go-around (TOGA) mode.

5. The method of claim 1, wherein controlling the one or more flight systems of the aircraft to perform the automated evasive maneuver to avoid the ground surface threat comprises controlling, by the one or more processing devices, engines and flight surfaces of the aircraft to pursue a procedural missed approach trajectory or a procedural go-around trajectory.

6. The method of claim 1, wherein controlling the one or more flight systems of the aircraft to perform the automated evasive maneuver to avoid the ground surface threat comprises:
   determining a trajectory for the automated evasive maneuver based on criteria comprising one or more of: a layout of an airport, local terrain and obstacles, trajectories of any proximate air traffic, and a state of the detected ground surface threat; and
   controlling the aircraft to pursue the determined trajectory.

7. The method of claim 1, wherein controlling the one or more flight systems of the aircraft to perform the automated evasive maneuver to avoid the ground surface threat comprises applying, by the one or more processing devices, changes to one or more of: one or more flaps, one or more elevators, one or more ailerons, and landing gear.

8. The method of claim 1, wherein controlling the one or more flight systems of the aircraft to perform the automated evasive maneuver to avoid the ground surface threat comprises at least one of: applying, by the one or more processing devices, brakes of a nose wheel of the aircraft, and steering, by the one or more processing devices, a nose wheel of the aircraft.

9. The method of claim 1, wherein the selected threshold of distance comprises an interval of distance traveled.

10. The method of claim 1, wherein the selected threshold of distance comprises a threshold of separation distance between the aircraft and the detected ground surface threat.

11. The method of claim 1, wherein the selected threshold of distance comprises a threshold of altitude change.

12. The method of claim 1, wherein the selected threshold of distance comprises criteria combining a distance and a threshold of deceleration or a threshold of heading change.

13. The method of claim 1, wherein the selected threshold of distance comprises criteria combining two or more of an interval of time, a threshold of distance traveled, a threshold of separation distance or separation time between the aircraft and the object of the threat, a threshold of altitude change, a threshold of vertical speed change, a threshold of deceleration, and a threshold of heading change.

14. A system comprising:
   one or more memory devices; and
   one or more processors operably coupled to the one or more memory devices and configured to:
      determine whether a sufficient evasive maneuver for an aircraft to avoid a detected ground surface threat is performed via pilot controls of the aircraft within a selected threshold of distance after an alert of the ground surface threat is outputted via one or more cockpit systems of the aircraft; and
      control, in response to determining that a sufficient evasive maneuver via the pilot controls is not performed within the selected threshold of distance, one or more flight systems of the aircraft to perform an automated evasive maneuver to avoid the ground surface threat.

15. The system of claim 14, further comprising:
   one or more processors configured to detect, prior to the determining whether the sufficient evasive maneuver for the aircraft to avoid the detected ground surface threat is performed via the pilot controls, the ground surface threat to the aircraft during a landing, taxiing, or takeoff of the aircraft; and one or more processors configured to generate, prior to the determining whether the sufficient evasive maneuver for the aircraft to avoid the detected ground surface threat is performed via the pilot controls, the alert of the ground surface threat via the one or more cockpit systems of the aircraft.

16. The system of claim 14, wherein the one or more processors configured to control the one or more flight systems of the aircraft to perform the automated evasive maneuver are configured to control the aircraft to execute one or more of a Takeoff/Go-around (TOGA) mode, a procedural go-around trajectory, and a determined trajectory based on criteria comprising one or more of: a layout of an airport, local terrain and obstacles, trajectories of any proximate air traffic, and a state of the detected ground surface threat.

17. The system of claim 14, wherein the one or more processors configured to control the one or more flight systems of the aircraft to perform the automated evasive maneuver are configured to control the aircraft to execute one or more of: applying brakes of a nose wheel of the aircraft, and steering a nose wheel of the aircraft.

18. The system of claim 14, wherein the one or more processors configured to determine whether a sufficient evasive maneuver for the aircraft to avoid the detected ground surface threat is performed via the pilot controls of the aircraft within the selected threshold of distance after the alert of the ground surface threat is outputted are configured such that the selected threshold of distance comprises one or more of: a threshold of distance traveled, a threshold of separation distance between the aircraft and the object of the threat, or a threshold of altitude change.

19. A computer program product comprising:

a non-transitory data storage device;

executable instructions stored on the data storage device to cause the one or more processing devices to determine whether a sufficient evasive maneuver for an aircraft to avoid a detected ground surface threat is performed via pilot controls of the aircraft within a selected threshold of distance after an alert of the ground surface threat is outputted via one or more cockpit systems of the aircraft; and executable instructions stored on the data storage device to cause the one or more processing devices to control, in response to determining that a sufficient evasive maneuver via the pilot controls is not performed within the selected threshold of distance, one or more flight systems of the aircraft to perform an automated evasive maneuver to avoid the ground surface threat.

20. The computer program product of claim 19, wherein the executable instructions to cause the one or more processing devices to control the one or more flight systems of the aircraft to perform an automated evasive maneuver comprise executable instructions to cause the one or more processing devices to control the one or more flight systems of the aircraft to perform at least one of: a Takeoff/Go-around (TOGA) mode; a procedural missed approach trajectory or a procedural go-around trajectory; a determined trajectory based on criteria comprising one or more of: a layout of an airport, local terrain and obstacles, trajectories of any proximate air traffic, and a state of the detected ground surface threat; application of brakes of a nose wheel of the aircraft; and steering of a nose wheel of the aircraft.

* * * * *